June 3, 1952  K. T. KÄLLE  2,599,459
TEMPERATURE RESPONSIVE MEASURING AND INDICATING APPARATUS
Filed July 12, 1949
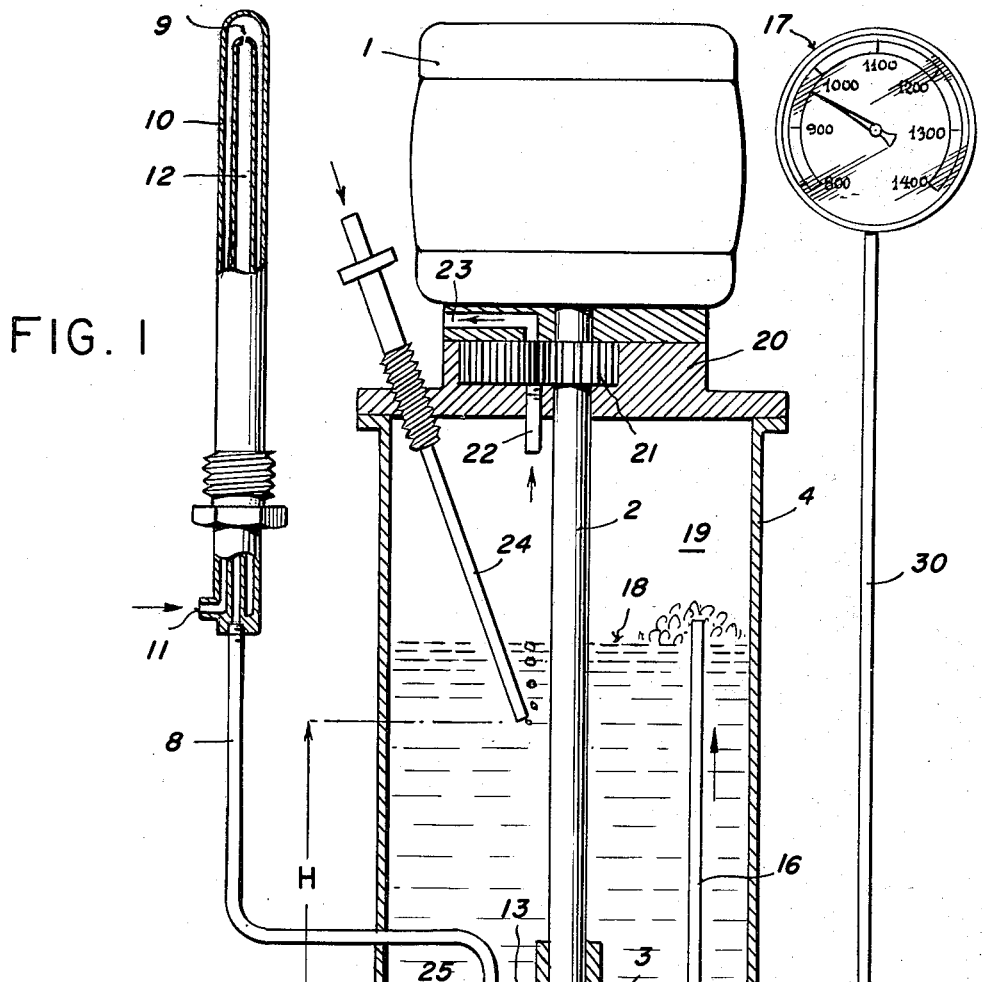
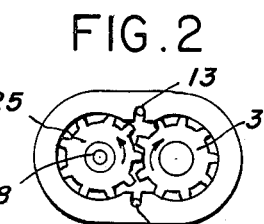
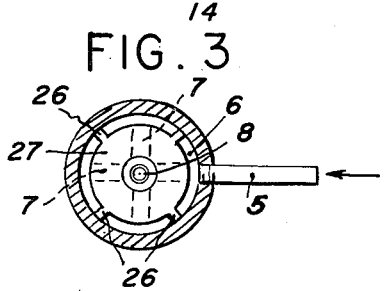
Inventor
KARL TORSTEN KALLE,
By Wenderoth, Lind & Ponack
Attorneys

UNITED STATES PATENT OFFICE 2,599,459

TEMPERATURE RESPONSIVE MEASURING AND INDICATING APPARATUS

Karl Torsten Källe, Säffle, Sweden

Application July 12, 1949, Serial No. 104,363
In Sweden April 7, 1948

5 Claims. (Cl. 73—357)

The present invention refers to an indicating apparatus, for instance for measuring temperatures, especially high temperatures, which apparatus includes a hollow member having a capillary opening adapted to be passed by a gas stream. More generally the apparatus may be used to indicate the density of a gas passing such a capillary opening, and in measuring temperatures, the density of the gas introduced through the capillary will be dependent on the temperature to which the hollow member is exposed.

Instruments for measuring the temperature and based on the above principle are previously known and in such instruments a gas, generally air, is by means of a suction pump caused to pass one or more capillary openings. The gas pressure before one single capillary opening or the difference in pressure between two such openings will be directly dependent on the temperature and by measuring this pressure or difference in pressure the temperature may be determined. As from a practical point of view the capillary openings cannot be made as small as is desired, the pressure variations are not great and therefore especially sensitive pressure measuring instruments are required, such instruments being delicate, difficult to handle and expensive. The small variations in pressure thus obtained may furthermore hardly be used for regulating purposes. In such cases where two capillary openings are used the one is subjected to the temperature to be measured and the other is at room temperature. This latter should not vary if the measurement is to be reliable but a constant room temperature is difficult to maintain.

The apparatus according to the invention makes it possible to measure as well as to regulate the temperature exactly and comprises in combination a hollow member having a capillary inlet adapted to be passed by a gas flow, a compressor pump connected to said member by a conduit, an inlet passage for liquid on the suction side of the compressor, said gas conduit ending into the liquid passage to introduce therein a mixture of gas and liquid, the pressure in the gas conduit determining and regulating the volumes of liquid and gas passing the compressor, a restricted outlet for gas and liquid from the pressure side of the compressor, a conduit from said pressure side communicating with an instrument indicating the pressure, said inlet for liquid on the suction side of the compressor being dimensioned to compensate for a varying viscosity of the liquid by causing a frictional resistance accommodated to the resistance in the restricted outlet from the pressure side.

A supposition for a reliable operation of the apparatus according to the invention is that the compressor pump works at a constant speed, i. e. a constant number of revolutions, such a constant speed being in turn dependent on a constant number of periods of the electric current. However, small fluctuations often occur in this number of periods, and therefore the invention also comprises a device which compensates such variations in the speed of the pump. Means may for instance be provided to let pass the liquid to the suction side of the pipe against the action of a centrifugal force, the magnitude of which being in direct proportion to the rotation speed of the compressor pump.

In the following the device according to the invention will be described more in detail with reference to the attached drawings, which show a suitable embodiment.

In the drawings:

Fig. 1 shows a view of the apparatus mainly in section.

Fig. 2 shows, seen from above, a gear wheel pump acting as compressor, and

Fig. 3 shows a section along the line III—III in Fig. 1 through another detail described in the following.

A feeling member to be inserted into a medium or a room, the temperature of which is to be measured, is shown to the left in Fig. 1 and consists of a tubular casing 10, closed at one end and provided with a threaded portion adapted to be threaded into a wall or the like. At the other end the casing 10 is in communication with the atmosphere or another gas by means of an inlet 11. Another tube 12 concentrically inserted in the casing 10 has a capillary opening 9 at its inner end. At its outer end said tube 12 is by means of a conduit 8 connected to an indicating device hereinafter described and which constitutes the main part of the invention. The feeling member, at least in principle, is previously known per se, and functions in such a way that the gas sucked in the space between the tubes 10 and 12 is heated to the temperature of the medium outside the feeling member and thereby this gas will have its density more or less changed. The gas passing the conduit 8 has already regained room temperature and as the compressor pump is constantly sucking an exact volume there will be a varying pressure fall in the capillary opening 9 and hereby the gas sucked by the compressor will get a higher or lower pressure.

Furthermore the apparatus shown in Fig. 1 contains an electric motor 1 having an elongated vertical driving shaft 2. At the lower end of this shaft there is fixed a gear 3 forming part of a gear wheel pump or compressor (Fig. 2) of the type having a constant pump volume. The pump is submerged in a liquid, preferably oil, which partly fills a surrounding container 4.

The driven gear wheel 25 of the compressor is connected to a rotor 27 placed below the gear and in spaced relation surrounded by a separate cylindrical casing 28. This rotor 27 is thus caused to rotate at the same speed as the gear wheel 25 (see also Fig. 3). The space 6 between the rotor 27 and the casing 28 is in communication with the surrounding container 4 by means of an inlet tube 5 through which liquid is sucked. Fans or blades 26 are fixed at the periphery of the rotor 27 and touch or sweep the inner wall of the cylindrical casing 28 so that the liquid ring in the space 6 is withdrawn at the same speed as the speed of the rotor. Said rotor has also radially and preferably diametrically arranged channels 7 which are connected to a channel 13 via an axial bore 29 through the rotor 27 and the gear wheel 25. Said channel 13 leads to the suction side of the compressor, the conduit 8 from the feeling member also entering the boring 29 and ending at the center of the rotor where the channels 7 meet. Thus a mixture of liquid and gas enters at the suction side of the compressor.

The pressure side of the compressor is connected to a conduit 14 which transmits variations in the pressure to a manometer 17. A branch 16 communicates with the conduit 14 by means of a restricted opening 15 and serves to discharge the mixture of liquid and gas back into the container. Another gear wheel pump 21 is located in the cap 20 of the container 4 and is also driven by the motor 1 in that one of its gear wheels is fixed to the motor shaft. This pump sucks gas from the closed space 19 above the liquid in the container 4 through a suction pipe 22 and blows out the gas through an exhaust pipe 23.

The gas sucked by the pump 21 from the space 19 is replaced by gas which is sucked through a vertically adjustable pipe 24 which ends below the liquid surface 18.

The apparatus works as follows: The pump 3, 25 partly sucks liquid through the tube 5 and partly gas through the conduit 8. If the volume of the compressor is constant and the speed of rotation of the compressor is also constant the sum of the volumes of liquid and gas is always constant. The mixture of liquid and gas returns to the container 4 through the restricted opening 15, the resistance within the same varying with changing proportions between gas and liquid in the mixture. The more gas the easier may the mixture flow through the restricted opening, so that the pressure in the conduit 14 will be lower. At a diminished proportion of gas in the mixture the pressure will be correspondingly higher. The amount of gas in the mixture is determined by the temperature in the feeling member 10 at the capillary opening 9. As very small amounts of gas are here in question the pressure loss in the conduit 8 is substantially negligible and may be overlooked.

On account of the change in density of the gas at different temperatures, the pressure fall in the capillary opening 9 is dependent on the temperature. If therefore, the temperature increases then the pressure fall (the resistance) in the capillary opening 9 will increase, thereby resulting in a lower pressure at the mouth of the conduit 8 in the rotor. Hereby the amount of liquid sucked in is increased and at the same time the amount of gas is reduced. The liquid mixture will contain less gas and the pressure in the conduit 14 after the pump will consequently increase and the manometer 17 will show a higher value corresponding to the new temperature. At falling temperature around the tube 10, the pressure fall in the capillary opening is diminished so that the gas pressure on the suction side of the pump will increase somewhat. The amount of liquid is then reduced correspondingly, resulting in a lower pressure in the conduit 30 and a lower reading on the manometer 17. Preferably the manometer is graded directly in degrees of temperature.

It has been proved that variations in temperature in the container 4 considerably reduce the exactness of the apparatus described. The gas sucked through the suction conduit 8 is, however, as already mentioned, cooled before its entrance and furthermore its volume is so insignificant compared to the size of the apparatus that it does not cause any considerable changes in temperature. On the other hand it cannot be overlooked that the liquid attains different temperatures and viscosities as the surrounding temperature varies from time to time. Upon changes in the viscosity of the liquid, the friction resistance in the suction tube 5 is changed so that the mixture of liquid and gas passing the compressor gets more or less rich in liquid. By a suitable dimensioning of the length and width of the suction tube 5 it has been found possible, according to the invention, to achieve the effect that for instance at increased viscosity, the resistance in the suction tube is increased so much that the proportion of liquid in the mixture is reduced in an extent such that the changed proportion compensates the higher viscosity of the liquid when the liquid flows out through the restricted opening 15. In other words the resistance in the tube 5 must be adjusted in relation to the outflow resistance in the opening 15. In this connection it is not possible to indicate any numerical values since the dimensions of the tube 5 as well as the opening 15 may vary considerably as to their construction and as to the ratio therebetween.

The variations in motor speed have such an influence that an increased speed will cause too high a reading on the measuring instrument and vice versa. This is based on the fact that the capacity of the compressor pump increases and decreases with the speed and that thereby a higher or lower pressure is required to cause the mixture of gas and liquid to pass the restricted opening 15 in the pressure conduit 14. This will be compensated in that the liquid on the suction side, before the mouth of the gas conduit 8, has to pass the space 6 containing the rotating liquid ring. In order that the liquid may enter the space 6, the pressure caused by the centrifugal force must thus be overcome. If, therefore, the speed of the compressor is increased the centrifugal force of the liquid in the space 6 will also increase and the resistance against its inflow is correspondingly increased. The pressure at the mouth of the conduit 8 then sinks a little so that the amount of gas is increased at the same time as the amount of liquid is decreased. The mixture of liquid and gas will be more rich in gas and will thus more easily pass the opening 15 and the pressure will not be increased although the speed of the compressor is higher.

By a suitable dimensioning of the space 6 it is thus possible to achieve that a change of the speed is always compensated by a change in the relation between the amount of gas and liquid in the mixture passing the opening.

The static pressure at the inlet of the suction tube 5 should preferably be constant if an exact measuring result is desired. If no special precautions are taken this static pressure will, however, become dependent on the liquid level in the container 4 which level later may be changed somewhat owing to leakage etc. According to another feature of the invention the influence of the liquid level in this respect has been entirely eliminated by arranging the pump 21 and the pipe 24 which work as follows: The cap 20 is closely fitted to the container 4 and the gas volume in 19 thus encased is withdrawn through the suction conduit 22 of the pump 21, whereby such a negative pressure arises that gas is sucked in from the outside through the pipe 24. The negative pressure in the space 19 will be dependent on the depth below the liquid surface 18 at which the pipe 24 ends. Thus an elevation of the liquid level is compensated by a corresponding lowering of the pressure above said surface and the static pressure prevailing at the inlet of the suction tube 5 is only dependent on the distance H between the last mentioned inlet and the discharge opening of the pipe 24, as indicated on the drawing. The device described may also be used for adjusting the measuring instrument. If the temperature around the feeling member 10 is known the pipe 24 is raised or lowered to such position that the manometer 17 shows said known temperature.

In this connection there may also be mentioned another way to control the reading of the measuring instrument. For that purpose the feeling member will be held at the same low temperature as the rest of the apparatus (i. e. room temperature) and a special nozzle is screwed on to the air intake 11. To control the exactness of the indicating apparatus the nozzle is fixed to the inlet 11 and the apparatus operated at normal temperature. The inlet opening of this nozzle determines the amount of gas supplied to the pump and the inlet is dimensioned so that it corresponds to a certain value on the gauge 17. If this value is not obtained the apparatus is defective. If the apparatus is faultless the pointer on the manometer 17 will point at a certain mark applied for such control.

The invention is, of course, not limited to the use of the feeling member described above, but is more generally applicable in connection with any such temperature sensitive members which provide a gas pressure or a gas flow which is dependent on the temperature to be measured. By connecting such a feeling member to the suction side of a compressor operating with a mixture of liquid and air considerable advantages are gained. In the first place the result of the measurement will be more exact than what has earlier been possible when using such feeling members and in the second place it is possible at the pressure side of the compressor to utilize the about 10,000 times amplified variations in pressure also for other purposes than indication of temperatures. A pressure change of 0.1 mm. water column at the capillary opening corresponds to a pressure change of 100 cm. water column in the pressure conduit 14 of a pump of proper capacity in the apparatus. The conduit 14 may thus advantageously at the same time be connected to different indicating and regulating devices, and in addition to the manometer shown, it may also be connected to registering or writing instruments or to devices regulating the temperature at a certain desired height etc.

The apparatus described above may also be used for other purposes than indicating temperatures. If, for instance, the temperature around the feeling member is held constant, and a gas having a constant temperature is introduced through the inlet 11, the apparatus will indicate a varying density of this gas, such variations being caused by changes in the composition of said gas. Thus the apparatus according to the invention may also be utilized to indicate the proportion of $CO_2$ in air or waste gas, the proportion of $SO_2$ in gases at pulp mills, etc.

I claim:

1. An indicating apparatus for measuring temperatures and the like, comprising a hollow member having a capillary inlet adapted to be passed by a gas flow, a compressor pump, a gas conduit connecting said pump to said member, said compressor pump having a liquid inlet tube on the suction side thereof, said gas conduit ending in the liquid tube whereby a mixture of gas and liquid is pumped by said pump, the pressure in the gas conduit determining the volumes of liquid and gas passing the compressor pump, a conduit connected to the pressure side of said compressor pump, a restricted outlet for gas and liquid connected into said conduit, a pressure indicating instrument communicating with said conduit from said pressure side, the length and width of said liquid inlet on the suction side of said compressor pump being so dimensioned with respect to one another as to compensate for a varying viscosity of the liquid by causing a frictional resistance accommodated to the resistance in the restricted outlet from the pressure side.

2. An indicating apparatus for measuring temperatures and the like, comprising a hollow member having a capillary inlet adapted to be passed by a gas flow, a rotatable compressor pump, a gas conduit connecting said pump to said member, said compressor pump having a liquid inlet tube on the suction side thereof, a centrifugal pump connected to said inlet tube and adapted to compensate for variations in speed of rotation of the compressor pump and allowing the liquid to pass against the action of the centrifugal force, said gas conduit ending in the liquid tube between the centrifugal pump and the compressor portion whereby a mixture of gas and liquid is pumped by the pump, the pressure in the gas conduit determining the volumes of liquid and gas passing the compressor pump, a conduit connected to the pressure side of said compression pump, a restricted outlet for gas and liquid connected into said conduit, a pressure indicating instrument communicating with said conduit from said pressure side, the length and width of said liquid inlet on the suction side of said compressor pump being so dimensioned with respect to one another as to compensate for a varying viscosity of the liquid by causing a frictional resistance accommodated to the resistance in the restricted outlet from the pressure side.

3. An indicating apparatus according to claim 2 and including a cylindrical casing forming a liquid inlet passage and adapted to hold a liquid and the centrifugal pump consists of a rotor provided with fans and mounted to rotate within said casing at the same speed as the compressor, a ring-shaped space being formed between the rotor and the casing, tubular liquid inlet means to said ring-shaped space from said casing, liquid introduced being caused to rotate within said space by said rotor, a radial channel through the rotor, and an axial channel through the rotor leading from said radial channel to the suction side of the compressor.

4. An indicating apparatus for measuring temperatures and the like, comprising a hollow member having a capillary inlet adapted to be passed by a gas flow, a closed container partly filled with liquid, a rotatable compressor pump placed within the container, a conduit connecting said pump to said hollow member, an inlet tube for liquid from the container to the suction side of the compressor pump, said gas conduit ending in the liquid inlet tube whereby a mixture of gas and liquid is pumped by said pump, the pressure in the gas conduit determining the volumes of liquid and gas passing the compressor pump, a conduit connected to the pressure side of said pump, a restricted outlet for gas and liquid connected into said conduit from the pressure side of the compressor and opening into said container, a pressure indicating instrument communicating with said conduit from said pressure side, a suction pump adapted to exhaust gas from the upper part of the container, a supplementary gas intake tube into said container ending below the liquid level of the container, the length and width of said liquid inlet on the suction side of said compressor pump being so dimensioned with respect to one another as to compensate for a varying viscosity of the liquid by causing a frictional resistance accommodated to the resistance in the restricted outlet from the pressure side.

5. An indicating apparatus according to claim 4, in which the mouth of said supplementary gas intake tube to the container is adjustable as to its depth below the liquid level whereby pressure in said container above the liquid level therein can be varied by movement of said tube.

KARL TORSTEN KÄLLE.

REFERENCES CITED

The following references are of record in the file of this patent:

FOREIGN PATENTS

| Number | Country | Date |
| --- | --- | --- |
| 211,880 | Great Britain | Apr. 16, 1925 |